United States Patent
Boone, Jr.

(10) Patent No.: US 9,160,865 B2
(45) Date of Patent: Oct. 13, 2015

(54) MOBILE PLATFORM AS A DELIVERY MECHANISM FOR SECURITY CAPABILITIES

(71) Applicant: Bank of America Corporation, Charlotte, NC (US)

(72) Inventor: James A. Boone, Jr., Suwanee, GA (US)

(73) Assignee: Bank of America Corporation, Charlotte, NC (US)

( * ) Notice: Subject to any disclaimer, the term of this patent is extended or adjusted under 35 U.S.C. 154(b) by 395 days.

(21) Appl. No.: 13/693,206

(22) Filed: Dec. 4, 2012

(65) Prior Publication Data
US 2014/0153706 A1    Jun. 5, 2014

(51) Int. Cl.
*H04M 11/00* (2006.01)
*H04M 11/06* (2006.01)

(52) U.S. Cl.
CPC ............ *H04M 11/06* (2013.01); *H04M 11/066* (2013.01)

(58) Field of Classification Search
USPC ........ 379/93.01, 93.02, 142.05, 88.02, 88.19, 379/88.2, 88.21, 211.04, 211.02
See application file for complete search history.

(56) References Cited

U.S. PATENT DOCUMENTS

| | | | |
|---|---|---|---|
| 5,517,562 A | 5/1996 | McConnell | 379/207 |
| 5,615,253 A | 3/1997 | Kocan et al. | 379/196 |
| 5,805,686 A | 9/1998 | Moller et al. | 379/198 |
| 6,181,925 B1 | 1/2001 | Kaminsky et al. | 455/410 |
| 6,856,982 B1 | 2/2005 | Stevens et al. | 706/50 |
| 7,031,465 B1 * | 4/2006 | Dibble et al. | 379/418 |
| 7,480,631 B1 | 1/2009 | Merced et al. | 705/35 |
| 8,165,572 B1 | 4/2012 | Kirchhoff et al. | 455/417 |
| 2006/0277092 A1 * | 12/2006 | Williams | 705/10 |

FOREIGN PATENT DOCUMENTS

| | | | | |
|---|---|---|---|---|
| GB | 2492973 | * | 7/2011 | G06Q 20/32 |
| GB | 2492973 A | | 1/2013 | G06Q 20/40 |

OTHER PUBLICATIONS

*ValidSoft; Redefining Fraud Prevention; ValidSoft Renews Its Core Authentication Patent*; 3 pages, Jun. 28, 2011.
*ValidSoft; Redefining Fraud Prevention; Solutions; ValidSoft Security Solutions in Action—Video* (http://www.validsoft.com/validsoft-security-solutions-in-action; 4 pages, Printed Dec. 4, 2012.
*TNS Transaction Network Services; Validation and Fraud Control Solutions*; 1 page, Printed Dec. 4, 2012.

* cited by examiner

*Primary Examiner* — Yosef K Laekemariam
(74) *Attorney, Agent, or Firm* — Michael A. Springs

(57) ABSTRACT

A system for making a trust determination of a telephone number includes a memory, which stores the telephone number, communicatively coupled to a processor. The processor transmits a request message, which comprises the telephone number and at least two of a telephone porting information request, a call forwarding information request, a telephone switching information request, and a telephone simultaneous ring information request, to a service provider. The processor then receives from the service provider a response message, which includes at least two of a telephone information response, a call forwarding information response, a telephone switching information response, and a telephone simultaneous ring information response. The processor then determines a tampering concern associated with at least one of the responses in the response message and increases an inquiry level based at least upon the determined tampering concern.

20 Claims, 5 Drawing Sheets

MOBILE PLATFORM AS A DELIVERY MECHANISM FOR SECURITY CAPABILITIES

TECHNICAL FIELD

This disclosure relates generally to transaction monitoring, information processing, and, more particularly, to a mobile platform as a delivery mechanism for security capabilities.

BACKGROUND

Enterprises may sometimes wish to contact their customers to verify that a particular customer's transactions were actually performed by the customer and not by an imposter. These entities may attempt to reach out to the customer with a telephone call or an SMS text message regarding these transactions. Imposters, however, may tamper with the customer's telephone, frustrating the verification process. For instance, imposters may port the customer's telephone number, set up call forwarding on the customer's telephone account, switch the telephone hardware associated with the customer's telephone account, or set up simultaneous ring service on the customer's telephone account to intercept the call intended for the customer.

SUMMARY

According to embodiments of the present disclosure, disadvantages and problems associated with previous systems may be reduced or eliminated.

According to one embodiment, a system for making a trust determination of a telephone number includes a memory, which stores the telephone number, communicatively coupled to a processor. The processor transmits a request message, which comprises the telephone number and at least two of a telephone porting information request, a call forwarding information request, a telephone switching information request, and a telephone simultaneous ring information request, to a service provider. The processor then receives from the service provider a response message, which includes at least two of a telephone information response that contains information responsive to the telephone porting information request, a call forwarding information response that contains information responsive to the call forwarding information request, a telephone switching information response that contains information responsive to the telephone switching information request, and a telephone simultaneous ring information response that contains information responsive to the telephone simultaneous ring information request. The processor determines a tampering concern associated with at least one of the responses in the response message. The processor then increases an inquiry level based at least upon the determined tampering concern.

According to another embodiment, a method for making a trust determination for a telephone number includes transmitting a request message to a service provider. The request message includes the telephone number and at least two of a telephone porting information request, a call forwarding information request, a telephone switching information request, and a telephone simultaneous ring information request. The method also includes receiving from the service provider a response message, which includes at least two of a telephone information response that contains information responsive to the telephone porting information request, a call forwarding information response that contains information responsive to the call forwarding information request, a telephone switching information response that contains information responsive to the telephone switching information request, and a telephone simultaneous ring information response that contains information responsive to the telephone simultaneous ring information request. Finally, the process includes determining a trust level for the telephone number based at least upon the response message.

According to another embodiment, a system for making a trust determination for a telephone number includes a memory, which stores a telephone information database, communicatively coupled to a processor. The processor receives from a user a request message, which comprises the telephone number and at least two requests, each of the at least two requests comprising at least one of a telephone porting information request, a call forwarding information request, a telephone switching information request, and a telephone simultaneous ring information request. The processor then receives from the telephone information database at least two responses, each of the at least two responses comprising at least one of a telephone porting information response associated with the telephone number and responsive to the telephone porting information request, a call forwarding information response associated with the telephone number and responsive to the call forwarding information request, a telephone switching information response associated with the telephone number and responsive to the telephone switching information request, and a telephone simultaneous ring information response associated with the telephone number and responsive to the telephone simultaneous ring information request. The processor then creates a response message, which comprises the at least two responses, and transmits the response message to the user.

Certain embodiments of the disclosure may provide one or more technical advantages. For example, the creation of request messages in a common format may allow the system to conserve processing power over a system in which one format of request message is converted to another format.

In other embodiments, the transmission of a single request message to a server may allow the system conserve bandwidth and processing power over a system in which individual requests are transmitted to a server.

In certain other embodiments, the determination of a second service provider associated with the telephone number for which a trust level determination will be made may allow the system to conserve bandwidth, processing power, and memory storage space over a system in which a determination is not made and request messages are sent to each potential service provider that might store responsive information.

In yet another embodiment, the sending of a single request message and awaiting a response before sending another request message may minimize the number of request messages transmitted, conserving processing power and bandwidth over systems that send each request message without waiting for a response.

Certain embodiments of the disclosure may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
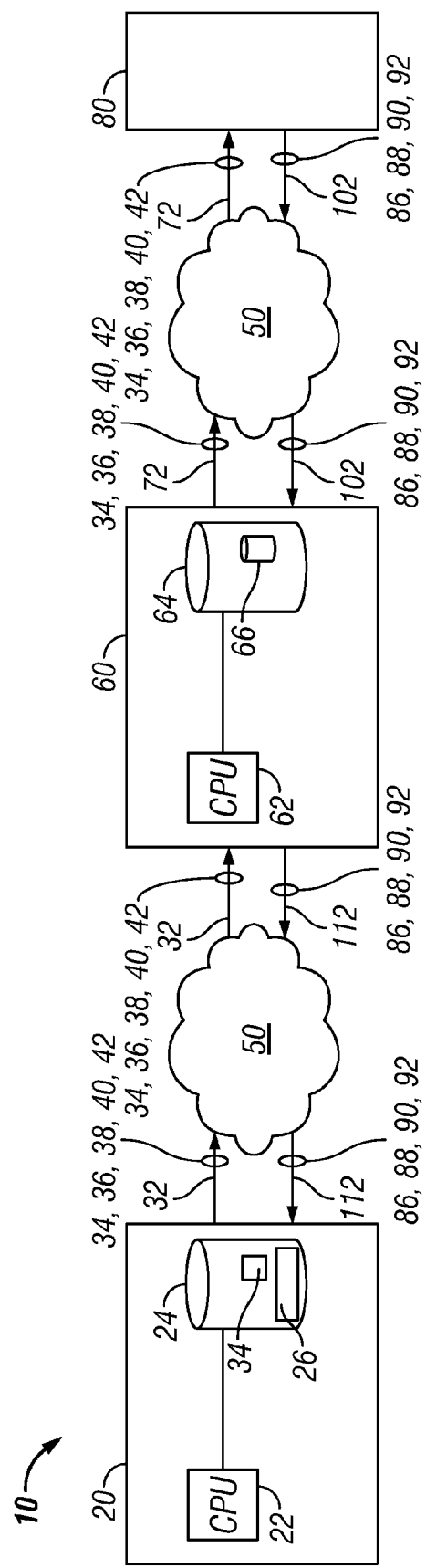
FIG. 1 illustrates a system for determining a trust level associated with a telephone number.

Embodiments of the present disclosure and its advantages are best understood by referring to FIGS. 1 through 4 of the drawings, like numerals being used for like and corresponding parts of the various drawings.

This disclosure describes a system for determining a trust level associated with a telephone number. Establishing a trust level for a telephone number may be useful, in some embodiments, when an important transaction was made on an account and an entity wants to verify that the important transaction was made by the actual customer and not by an imposter posing as the customer. To verify such a transaction, entities may sometimes want to contact the customer using a telephone number associated with the customer. It therefore becomes important to determine that the telephone number is still in the control of the customer and has not been tampered with by the imposter, i.e., that a call to the telephone number would be answered by the actual customer and would not be redirected, in some way, to the imposter.

To determine a trust level for the telephone number to which the enterprise wishes to make an outbound call, an outbound SMS message, or some other communication, an enterprise server may first store the telephone number. The enterprise server may then create a request message containing the telephone number and various requests aimed at determining whether the telephone number has been tampered with by an imposter. These requests, for example, may seek information about certain suspicious events, such as whether the telephone number has been ported or forwarded, whether the telephone hardware has been switched, or whether simultaneous ring service has been activated for the telephone number. For each of these requests, the request message may also request a date and time associated with each suspicious event.

The enterprise server may then transmit the request message to a service provider server and ask for responses to the requests in the request message. After receiving responses from the service provider server, the enterprise server may then use the responses in the response message along with certain criteria to determine whether a tampering concern is raised by any of the responses. The tampering concern may indicate that the enterprise should be wary of using the telephone number to contact the customer and should consider utilizing alternate means of verifying the important transaction. In some embodiments, a tampering concern may be raised when the response message contains information that the telephone number has been ported or forwarded, that the telephone hardware has been switched, or that simultaneous ring service has been activated on the telephone number. In some embodiments, a tampering concern is raised only if one of these suspicious events occurred within a specified period of time from the time of the request, e.g., the telephone number was ported less than one day before the time of the request.

Using the response message and the tampering concerns raised, the enterprise server may determine a trust level associated with the telephone number. Then depending upon the trust level, the enterprise server may set an inquiry level associated with the telephone number. This inquiry level may instruct an agent on what actions to take to verify that the important transaction was actually made by the customer and not by an imposter.

FIG. 1 illustrates a system 10 for determining a trust level associated with a telephone number 34. System 10 may contain an enterprise server 20 connected to a first service provider server 60 through a network 50. The first service provider server 60 may be connected to a second service provider server 80 through a network 50 as well.

Enterprise server 20 is associated with an enterprise that wishes to determine a trust level associated with a telephone number 34. This may occur, in some embodiments, when it appears that a customer associated with telephone number 34 has made an important transaction, and the enterprise wishes to verify that the transaction was made by the actual customer and not by an imposter.

Enterprise server 20 comprises an enterprise server processor 22 communicatively coupled to an enterprise server memory 24. Enterprise server processor 22 may include any hardware and/or software that operates to control and process information. Enterprise server processor 22 may be a programmable logic device, a microcontroller, a microprocessor, any suitable processing device, or any suitable combination of the preceding.

The enterprise server memory 24 may store data and information for use in determining a trust level associated with the telephone number 34. For instance, the enterprise server memory 24 may store the telephone number 34. Enterprise server memory 24 may store, either permanently or temporarily, data, operational software, or other information for enterprise server processor 22. Enterprise server memory 24 may include any one or a combination of volatile or non-volatile local or remote devices suitable for storing information. For example, enterprise server memory 24 may include random access memory (RAM), read only memory (ROM), magnetic storage devices, optical storage devices, or any other suitable information storage device or a combination of these devices.

In certain embodiments, the enterprise server memory may additionally store enterprise server criteria 26. The enterprise server criteria 26 may aid the enterprise server processor 22 in determining whether certain events associated with the telephone number 34 should raise a tampering concern. The process of determining whether a tampering concern should be raised will be discussed in greater detail later in this disclosure. Enterprise server criteria 26 may comprise data, an electronic file, software, or any other executable code or module operable to aid the enterprise server processor in determining whether certain events associated with the telephone number 34 should raise a tampering concern.

To make the determination of a trust level associated with the telephone number 34, the enterprise server 20 may attempt to gather information about the telephone number 34. This information may comprise data on whether the telephone number 34 has been ported or forwarded, whether telephone hardware associated with telephone number 34 has been switched, or whether simultaneous ring service has been activated for telephone number 34. In some embodiments, this information may not be stored locally in enterprise server memory 26. In these instances, the enterprise server 20 may request this information from other sources. To do so, the enterprise server processor 22, in some embodiments, may create a request message 32 containing at least one of the telephone number 34, a telephone porting information request 36, a call forwarding information request 38, a telephone switching information request 40, and a telephone simultaneous ring information request 42 and transmit the request message 32 through network 50 to a first service provider server 60. In some embodiments, the transmission of a single request message 32 to a first service provider server 60 may allow the system 10 conserve bandwidth and processing power over a system in which individual requests are transmitted.

This disclosure contemplates any suitable network 50 operable to facilitate communication between the components of the system. Network 50 may include any interconnecting system capable of transmitting audio, video, signals, data, messages, or any combination of the preceding. Network 50 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components. Network 50 may additionally include any combination of gateways, routers, hubs, switches, access points, base stations, wireless telephone systems and any other hardware, software or a combination thereof.

Request message 32 may include any electronic transmission that carries data, such as a simple mail transfer protocol (SMTP) message, a short message service (SMS) message, a network packet, a computer file, an email, an HTML request, an XML request, or a combination of these or other suitable transmissions.

As stated above, the request message 32 may contain at least one of the telephone number 34, a telephone porting information request 36, a call forwarding information request 38, a telephone switching information request 40, and a telephone simultaneous ring information request 42. In certain embodiments, the telephone porting information request 36 requests whether the telephone number 34 has been ported from one service provider to another service provider. In other words, information is sought as to whether a customer, or an imposter posing as the customer, switched service providers for the telephone number 34 but elected to keep the same telephone number. The telephone porting information request 36 may additionally request a date and a time associated with porting of the telephone number 34, if the telephone number 34 has in fact been ported. Such a request may aid system 10 in determining whether it is possible that an imposter has ported the telephone number 34 such that the imposter would receive a call to telephone number 34 instead of the actual customer.

In some embodiments, the call forwarding information request 38 requests whether calls to the telephone number 34 are being forwarded to a different telephone or telephone number. In other words, information is sought as to whether a customer, or an imposter posing as the customer, has requested that calls to telephone number 34 be forwarded so that the calls will be received at a different telephone or telephone number. Call forwarding may also be known as call diversion. The call forwarding information request 38 may additionally request a date and a time associated with the request to forward calls for the telephone number 34, if such a forwarding request has in fact been made. Such a request may aid system 10 in determining whether it is possible that an imposter has forwarded the telephone number 34 to a number under the imposter's control such that the imposter would receive a call to telephone number 34 instead of the actual customer.

The telephone switching information request 40 requests, in some embodiments, whether the telephone associated with the telephone number 34 has been switched to different telephone hardware. For instance, the telephone switching information request 40 may query whether a customer, or an imposter posing as the customer, has requested that the service provider for telephone number 34 switch the telephone hardware associated with telephone number 34. In some embodiments, the telephone phone switching information request 40 may query whether the service provider has made a change to the specific piece of hardware to which it routes mobile calls made to telephone number 34. Such telephone hardware switches may be evidenced, in certain embodiments, by a SIM card change, a make or model of mobile phone change, an IMEI change, a MAC address change, etc. The telephone switching information request 40 may additionally request a date and a time associated with the switching of telephone hardware associated with telephone number 34, if such a telephone hardware switch has in fact been made. Such a request may aid system 10 in determining whether it is possible that an imposter has switched the telephone hardware associated with telephone number 34 such that a call to telephone number 34 would ring on hardware under the control of the imposter instead of hardware under the control of the actual customer.

Finally, in some embodiments, the telephone simultaneous ring information request 42 requests whether calls to telephone number 34 will ring on another telephone simultaneously. For instance, the telephone simultaneous ring information request may query whether a call to telephone number 34 may ring on any other telephone number simultaneously. The telephone simultaneous ring information request 42 may additionally request a date and a time associated with the request to simultaneously ring calls for the telephone number 34 on another telephone number, if such a request has in fact been made. Such a request may aid system 10 in determining whether it is possible that an imposter has set up simultaneous ring service on telephone number 34 such that a call to telephone number 34 would simultaneously ring on a telephone number under the imposter's control.

Each of the above described requests asks for information that may aid the enterprise server 20 in determining whether the telephone number 34 may be trusted for the purposes of verifying an important transaction. In some embodiments, the fact that any one of the above described events has occurred may raise suspicion as to whether a call to telephone number 34 would reach the actual customer and not an imposter.

The request message 32 containing these requests is transmitted by the enterprise server 20 to the first service provider server 60. The first service provider server 60 is associated with a first service provider that provides telephone services to its customers. This first service provider may, in some embodiments, provide telephone services to the enterprise associated with the enterprise server 20.

The first service provider server 60 comprises a first service provider processor 62 communicatively coupled to a first service provider memory 64. The first service provider memory 64 may, in certain embodiments, store a telephone information database 66. The telephone information database 66 contains information about telephone numbers associated with the first service provider. For instance, the telephone information database may contain information about whether a certain telephone number 34 has been ported or forwarded, whether the telephone hardware has been switched, or whether simultaneous ring service has been activated for a certain telephone number 34. This information is maintained, in some embodiments, only for those telephone numbers 34 for which the first service provider provides telephone services. Thus, in certain embodiments, if the customer associated with telephone number 34 does not receive telephone services from the first service provider, then the telephone information database 66 may not store any information regarding the telephone number 34.

The first service provider processor 62 may include any hardware and/or software that operates to control and process information. First service provider processor 62 may be a programmable logic device, a microcontroller, a microprocessor, any suitable processing device, or any suitable combination of the preceding. First service provider memory 64 may store, either permanently or temporarily, data, operational software, or other information for first service provider processor 62. The first service provider memory 64 may include any one or a combination of volatile or non-volatile local or remote devices suitable for storing information. For example, first service provider memory 64 may include random access memory (RAM), read only memory (ROM), magnetic storage devices, optical storage devices, or any other suitable information storage device or a combination of these devices.

In certain embodiments, the first service provider may provide telephone services to both the enterprise and to the customer associated with telephone number 34. In such a case, the first service provider server may be able to respond to the requests in request message 32. The first service provider processor 62 may search the telephone information database 66 for information associated with telephone number 34 and responsive to the requests in request message 32. The first service provider processor 62 may receive such responsive information and create a response message 112. This response message 112 contains information the enterprise server 20 will use to determine a trust level for the telephone number 34. The first service provider processor 62 may then transmit the response message 112 to the enterprise server 20 through the network 50 so that the determination of a trust level may be made.

Response message 112 may include any electronic transmission that carries data, such as a simple mail transfer protocol (SMTP) message, a short message service (SMS) message, a network packet, a computer file, an email, an HTML request, an XML request, or a combination of these or other suitable transmissions. Response message 112 may contain at least one of a telephone porting information response 86, a call forwarding information response 88, a telephone switching information response 90, and a telephone simultaneous ring information response 92.

In certain embodiments, the telephone porting information response 86 contains information about whether the telephone service associated with the telephone number 34 has been ported from one service provider to another service provider. The telephone porting information response 86 may additionally include a date and a time associated with the porting of the telephone number 34, if the telephone number 34 has in fact been ported.

In some embodiments, the call forwarding information response 88 contains information about whether calls to the telephone number 34 are being forwarded to a different telephone. The call forwarding information response 88 may additionally include a date and a time associated with the request to forward calls for the telephone number 34, if such a forwarding request has in fact been made.

The telephone switching information response 90, in some embodiments, contains information about whether the telephone associated with the telephone number 34 has been switched to different telephone hardware. The telephone switching information response 90 may additionally include a date and a time associated with the switching of telephone hardware associated with telephone number 34, if such a telephone hardware switch has in fact been made.

Finally, in some embodiments, the telephone simultaneous ring information response 92 contains information about whether calls to telephone number 34 will ring on another telephone simultaneously. The telephone simultaneous ring information response 92 may additionally include a date and a time associated with the request to simultaneously ring calls for the telephone number 34 on another telephone, if such a request has in fact been made.

Alternatively, in some embodiments, the telephone information database 66 may not store any information that responds to the requests in request message 32 or may not store complete information to satisfy each request in request message 32. This situation may occur, in certain embodiments, when the first service provider provides telephone services to the enterprise but not to the customer associated with telephone number 34. In these instances, the first service provider server 60 may determine which service provider—a second service provider—provides telephone services to the customer associated with the telephone number 34.

The first service provider may then request the information sought by the enterprise from this second service provider. To do so, the first service provider processor may create a request message 72 containing at least one of the telephone number 34, the telephone porting information request 36, the call forwarding information request 38, the telephone switching information request 40, and the telephone simultaneous ring information request 42 and transmit the request message 72 through network 50 to a second service provider server 80. The contents of the request message 72 may, in some embodiments, be the same as the contents of request message 32. In certain embodiments, request message 32 and request message 72 may be in a common format so that conversion between formats is unnecessary. The creation of a request message 72 in a common format may allow the system 10 to conserve processing power over a system that converts one format of request message 72 to another compatible format.

In certain embodiments, the determination of the second service provider associated with the telephone number 34 may allow the system 10 to conserve bandwidth, processing power, and memory storage space over a system in which request messages 72 are sent to each potential second service provider that might store information responsive to the requests in request message 72.

After sending the request message 72, the first service provider processor 62 waits until it receives a response message 102 from the second service provider server 80. The response message 102 contains responses to at least one of the various requests in the request message 72. The first service provider processor 62 may then use at least the response message 102 to create a response message 112. The contents of the response message 112 may, in some embodiments, be the same as the contents of response message 102. In certain embodiments, response message 102 and response message 112 may be in a common format so that conversion between formats is unnecessary. Finally, the first service provider processor may transmit the response message 112 to the enterprise server 20 through the network 50.

As stated above, these responses may aid the enterprise server 20 in determining a trust level associated with the telephone number 34. The enterprise server processor 22 may receive the response message 112 from the first service provider server 60 and store it in the enterprise server memory 24.

After the enterprise server 20 receives the response message 112, the enterprise server 20, in some embodiments, has sufficient information to determine a trust level for the telephone number 34. In general, the enterprise server 20 determines this trust level by determining if any suspicious events are associated with the telephone number 34 and, if so, whether any of those suspicious events occurred within a time threshold determined by the enterprise server criteria 26.

More specifically, in some embodiments, the enterprise server processor 22 may determine from the responses in response message 112 whether the telephone number 34 has been ported or forwarded, whether telephone hardware associated with telephone number 34 has been switched, or whether simultaneous ring service has been activated for telephone number 34. The occurrence of any of these events is potentially suspicious and could raise a tampering concern since it could indicate that an imposter might receive a call to the telephone number 34 instead of the customer.

In certain embodiments, the occurrence of these events is considered suspicious and may raise a tampering concern only if the event occurred within a time threshold contained within the enterprise server criteria 26. For instance, the enterprise server criteria 26 could contain a telephone porting threshold of two days. Thus, a telephone porting event reported by the telephone porting information response 86 would be considered suspicious and raise a tampering concern if the date of the telephone porting event indicated that the telephone porting event occurred at most two days ago. These time thresholds may help to filter out false positive tampering concerns—that is, to filter out those events that occurred far enough away from the time of the important transaction that it is unlikely that they indicate that the telephone number 34 has been tampered with. By way of example, a telephone number 34 that began call forwarding service only hours before the trust level determination is more likely to be correlated to a tampering concern than a telephone number 34 that started call forwarding service over a year before the trust level determination. Thus, by using enterprise server criteria 26, the accuracy of the trust level determined by the enterprise server 20 may be improved.

If a tampering concern has been determined regarding at least one of the responses, the enterprise server processor 22 may alter the trust level associated with the telephone number 34. The trust level may, in certain embodiments, inform the enterprise server 20 of how confident the enterprise should be that a call made to telephone number 34 will reach the actual customer and not an imposter. The trust level, additionally, in some embodiments, may be used by the enterprise server 20 to alter an inquiry level associated with the telephone number 34.

The inquiry level may, in some embodiments, be associated with various methods of verifying the important transaction. One inquiry level could indicate that a human agent should attempt to contact the telephone number 34 to verify the transaction while another could indicate that an automated call or SMS text message should be made to the telephone number 34 to verify the transaction. Other methods of verification could include, but are not limited to, calling other telephone numbers associated with the customer's account, sending an email to an email address associated with the customer's account, or calling a different telephone number associated with the customer's account.

In certain embodiments, the inquiry level may indicate that more personalized attempts to contact the customer, such as calls by human agents to the telephone number 34 or to another telephone number associated with the customer's account, should be utilized. This may occur when the trust level indicates that a tampering concern exists and that the enterprise should have less confidence that a call to the telephone number 34 will reach the actual customer and not an imposter. On the other hand, in certain embodiments, the inquiry level may indicate that less personalized attempts to contact the customer, such as calls by automated agents to the telephone number 34 or SMS text messages sent to the telephone number 34, should be utilized. This may occur when the trust level indicates that no tampering concern exists and that the enterprise should have more confidence that a call to the telephone number 34 will reach the actual customer and not an imposter.

In operation, the system 10 determines a trust level for a telephone number 34. One operational embodiment of the present disclosure is now discussed. In this example operational embodiment, on Jan. 12, 2012 at 8:00 p.m., the system 10 wishes to determine a trust level for (555) 555-5555—a telephone number 34 that receives telephone services from the first service provider and is associated with an important transaction that the enterprise wants to verify. For purposes of this example, the phone number 34 was ported from an outside service provider to the first service provider on Jan. 5, 2011 at 1:00 p.m. (more than a year before the trust level determination), and simultaneous ring service was initiated on Jan. 12, 2012 at 3:00 p.m. (five hours before the trust level determination). Finally, the enterprise server criteria 26 indicates that an event raises a tampering concern if it occurred within two days of the transmission of the request message 32.

To begin the process of determining a trust level associated with the phone number 34, the enterprise server 20 first stores the telephone number 34 in the enterprise server memory 26. The enterprise server processor 22 then creates a request message 32 that requests information that will aid the enterprise server 20 in determining the trust level. The enterprise server 20 then transmits the request message 32 to a server associated with the enterprise's telephone service provider—the first service provider server 60.

At the first service provider server 60, the first service provider processor 62 receives the request message 32. As stated above, the (555) 555-5555 telephone number 34 receives its telephone services from the first service provider, so the telephone information database 66 stores responsive information about the phone number 34. The first service provider processor 62 then receives the information from the telephone information database 66 and uses that information to create the response message 112.

In this example, the telephone porting information response 86 indicates that a telephone porting event occurred on Jan. 5, 2011 at 1:00 p.m., and the telephone simultaneous ring information response 92 indicates that simultaneous ring service was set up on Jan. 12, 2012 at 3:00 p.m. The call forwarding information response 88 and the telephone switching information response 90 indicate that no relevant events occurred. The first service provider processor 62 then transmits the response message 112 to the enterprise server 20.

Upon receiving the response message 112, the enterprise server 20 has sufficient information to determine a trust level for the telephone number 34. The enterprise server processor 22 receives the telephone porting information response 86, the call forwarding information response 88, the telephone switching information response 90, and the telephone simultaneous ring information response 92 from the response message 112.

The enterprise server processor 22 then uses the responses obtained from the response message 112 to determine whether a tampering concern exists for the telephone number 34. The enterprise server processor 22 first determines that no events are indicated from either the call forwarding information response 88 or the telephone switching information response 90.

As for the telephone porting information response 86, the enterprise server processor 22 determines that a potentially suspicious event did occur since the telephone number 34 was ported on Jan. 5, 2011 at 1:00 p.m. The enterprise server processor then determines whether a tampering concern exists according to the enterprise server criteria 26. The enterprise server criteria 26 indicates that an event raises a tampering concern if it occurred within two days of transmission of the request message 32. In this example, the telephone porting event occurred on Jan. 5, 2011 at 1:00 p.m.—more than a year before the transmission of the request message 32 on Jan. 12, 2012 at 8:00 p.m. The enterprise server processor 22 thus determines that no tampering concern exists regarding the telephone porting information response 86.

Finally, as to the telephone simultaneous ring information response 92, the enterprise server processor 22 determines that a potentially suspicious event did occur since the telephone number 34 set up simultaneous ring service on Jan. 12, 2012 at 3:00 p.m. The enterprise server processor 22 then determines whether a tampering concern exists according to the enterprise server criteria 26. Because the telephone simultaneous ring event occurred on Jan. 12, 2012 at 3:00 p.m., less than two days before the transmission of the request message, the enterprise server processor 22 determines that a tampering concern does exist regarding the telephone simultaneous ring information response 92.

Having determined that a tampering concern exists, the enterprise server processor 22 then alters the trust level associated with the telephone number 34. The trust level informs the enterprise server 20 that the enterprise should not be confident that a call made to telephone number 34 will reach the actual customer and not an imposter.

Then, using at least the trust level, the enterprise server processor 22 determines an inquiry level for the telephone number 34. In this example, because the trust level indicates that the enterprise should not be confident in the telephone number 34, the inquiry level may be set to indicate that a human agent should attempt to contact the telephone number 34 to verify the transaction. The human agent may then ask security questions or employ other methods of verifying that he is actually talking to the customer and not an imposter. This is in contrast to inquiry levels set when the trust level shows that the enterprise can be confident in the telephone number 34—in those instances, the inquiry level could indicate that an automated call or SMS text message should be made to the telephone number 34 to verify the transaction.

Modifying the preceding example, if the enterprise server criteria 26 indicated that an event raises a tampering concern only if it occurred within four hours of the transmission of the request message 32, then no tampering concern would be raised by the telephone simultaneous ring information response 92. This is because the event occurred five hours before the transmission of the request message 32 and falls outside of the threshold set by the enterprise server criteria 26. In this instance, because no tampering concerns are raised, the enterprise server processor 22 would determine a trust level that indicates that the enterprise can have more confidence that a communication to the telephone number 34 will reach the actual customer and not an imposter. The inquiry level may then be determined such that the enterprise is directed to verify the transaction using an automated call, an SMS text message, or some other communication that requires less resources to be expended by the enterprise than an action by a human agent.

Again, modifying the original example, if the telephone number 34 did not receive telephone services from the first service provider but instead from service provider Company A, then the first service provider server 60 would determine that Company A provides telephone services to the telephone number 34. The first service provider server 60 would then create a request message 72 and transmit it to Company A. The first service provider server 60 would then receive a response message 102 from Company A and use it to create a response message 112. The first service provider would then transmit the response message 112 to the enterprise server 20, so that the enterprise server could determine a trust level for the telephone number 34.

Figure 2:
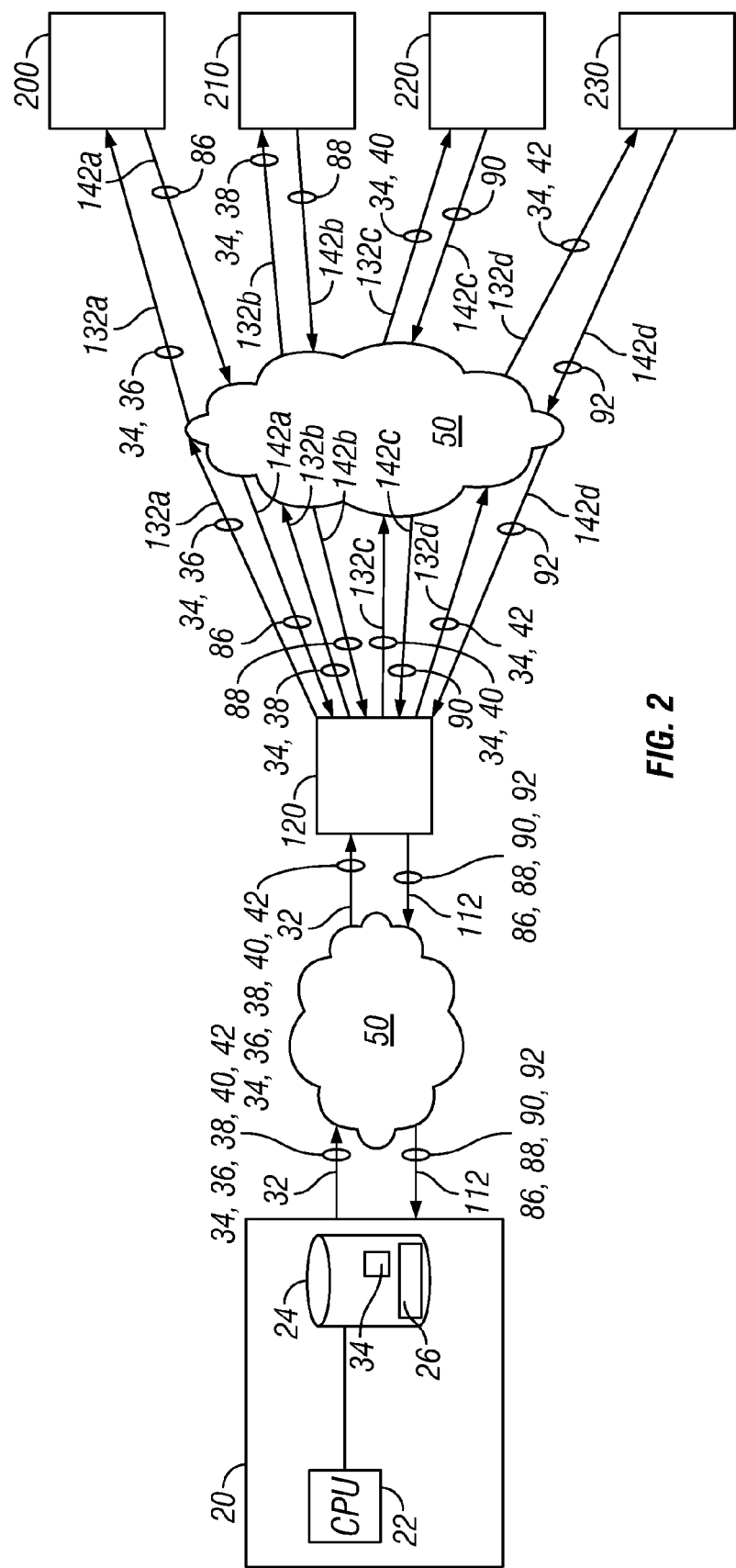
FIG. 2 illustrates another embodiment of a system for determining a trust level associated with a telephone number.

FIG. 2 illustrates another embodiment of a system 10 for determining a trust level associated with a telephone number 34. In this embodiment, all components and processes to the left of the first network 50 remain the same as they were described in FIG. 1. The embodiment illustrated in FIG. 2 differs in the components and processes used to gather responses to the requests in the request message 32. Specifically, the enterprise server 20 may transmit the request message 32 to an aggregation server 120.

The aggregation server 120 may receive the request message 32 and create four distinct requests—a telephone porting information request message 132*a*, containing the telephone number 34 and the porting information request 36; a call forwarding information request message 132*b*, containing the telephone number 34 and the call forwarding information request 38; a telephone switching information request message 132*c*, containing the telephone number 34 and the telephone switching information request 40; and a telephone simultaneous ring information request message 132*d*, containing the telephone number 34 and the telephone simultaneous ring information request 42. By creating four distinct requests, the aggregation server may transmit each request to a different server to fulfill. This may be useful if one server maintains information about telephone porting, another server maintains information about call forwarding, etc.

The aggregation server 120 may then transmit the telephone porting information request message 132*a* through network 50 to a telephone porting information server 200, which stores information about whether the telephone number 34 has been ported. Similarly, the aggregation server 120 may transmit the call forwarding information request message 132*b* through network 50 to a call forwarding information server 210, which stores information about whether calls to the telephone number 34 are being forwarded to another number. The aggregation server 120 may transmit the telephone switching information request message 132*c* through network 50 to a telephone switching information server 220, which stores information about whether the telephone hardware associated with the telephone number 34 has been switched. Finally, the aggregation server 120 may transmit the telephone simultaneous ring request message 132*d* through network 50 to a telephone simultaneous ring information server 230, which stores information about whether calls to telephone number 34 simultaneously ring on other telephone numbers.

The aggregation server 120 may then receive a telephone porting information response message 142*a* containing the telephone porting information response 86, a call forwarding information response message 142b containing the call forwarding information response 88, a telephone switching information response message 142c containing the telephone switching information response 90, and a telephone simultaneous ring information response message 142d containing the telephone simultaneous ring information response 92. These responses are received from the telephone porting information server 200, the call forwarding information server 210, the telephone switching information server 220, and the telephone simultaneous ring information server 230, respectively. These responses contain the information that will be used by the enterprise server 20 in determining a trust level for the telephone number 34.

After receiving the responses to each of the request messages 132a-132d, the aggregation server 120 may aggregate these response messages 142a-142d and create a response message 112. The response message 112 may contain the telephone porting information response 86, the call forwarding information response 88, the telephone switching information response 90, and the telephone simultaneous ring information response 92. The aggregation server 120 may then transmit the response message 112 to the enterprise server 20 through network 50 so that enterprise server 20 may determine a trust level for the telephone number 34. The process of determining the trust level is described above in the discussion of FIG. 1.

Figure 3:
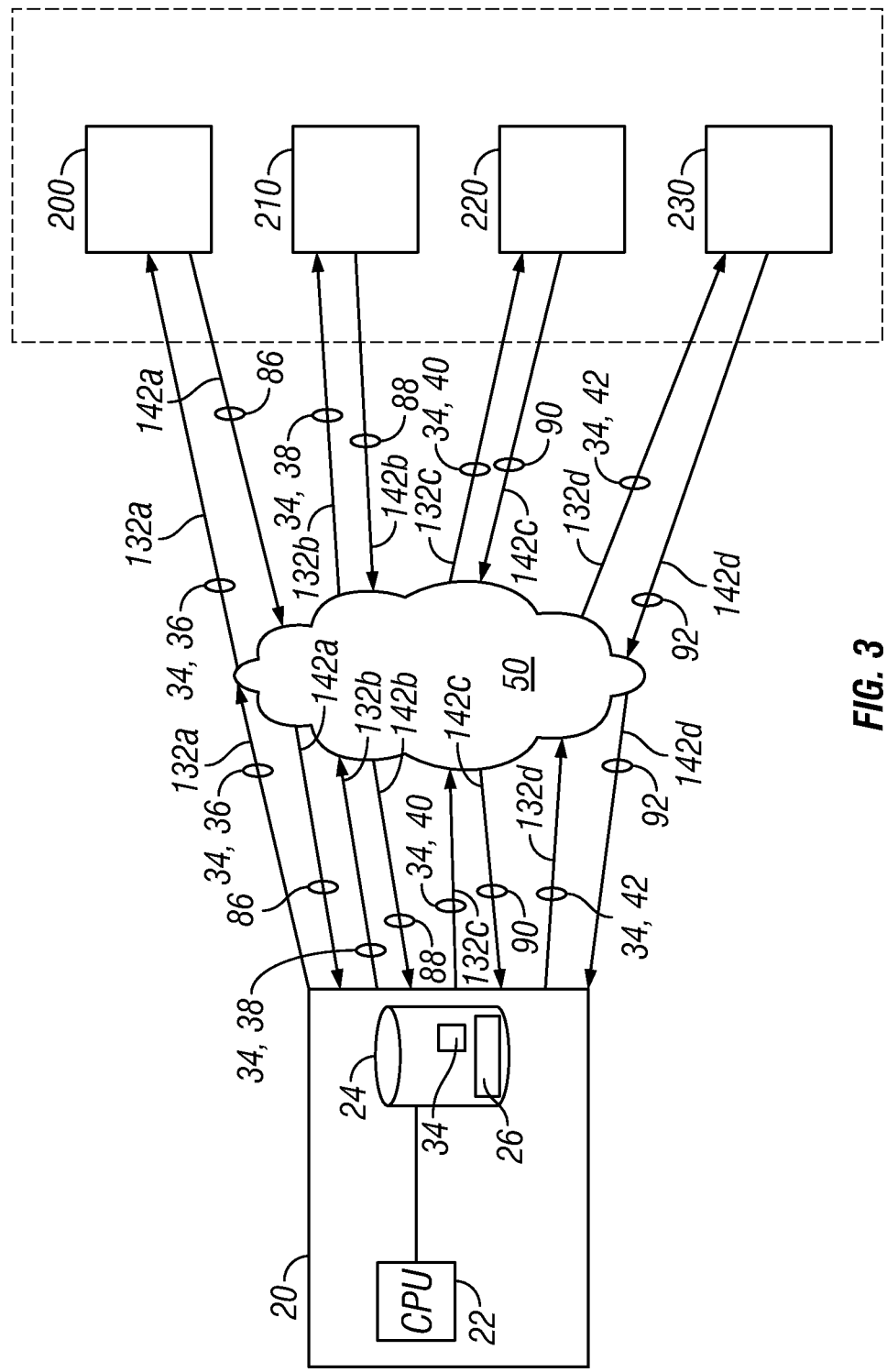
FIG. 3 illustrates yet another embodiment of a system for determining a trust level associated with a telephone number.

FIG. 3 illustrates yet another embodiment of a system 10 for determining a trust level associated with a telephone number 34. In this embodiment, the enterprise server 20 itself transmits separate requests to servers to obtain the information that will be used for the trust level determination.

Specifically, the enterprise server 20 may transmit the telephone porting information request message 132a through network 50 to a telephone porting information server 200, which stores information about whether the telephone number 34 has been ported. Similarly, the enterprise server 20 may transmit the call forwarding information request message 132b through network 50 to a call forwarding information server 210, which stores information about whether calls to the telephone number 34 are being forwarded to another number. The enterprise server 20 may transmit the telephone switching information request message 132c through network 50 to a telephone switching information server 220, which stores information about whether the telephone hardware associated with the telephone number 34 has been switched. Finally, the enterprise server 20 may transmit the telephone simultaneous ring request message 132d through network 50 to a telephone simultaneous ring information server 230, which stores information about whether calls to telephone number 34 simultaneously ring on other numbers.

The enterprise server 20 may then receive a telephone porting information response message 142a containing the telephone porting information response 86, a call forwarding information response message 142b containing the call forwarding information response 88, a telephone switching information response message 142c containing the telephone switching information response 90, and a telephone simultaneous ring information response message 142d containing the telephone simultaneous ring information response 92. These responses are received from the telephone porting information server 200, the call forwarding information server 210, the telephone switching information server 220, and the telephone simultaneous ring information server 230, respectively. These responses contain the information that will be used by the enterprise server 20 in determining a trust level for the telephone number 34. The process of determining the trust level is described above in the discussion of FIG. 1.

In certain embodiments, enterprise server 20 may transmit one of the request messages 132a-132d and await the corresponding response message before transmitting another one of the request messages 132a-132d. This may be helpful if there are costs associated with sending request messages and the system 10 wishes to minimize these costs. For instance, the enterprise server 20 may elect to send request messages 132a-132d one-at-a-time until the enterprise server processor 22 determines that a tampering concern exists regarding one of the corresponding response messages 142a-142d.

For instance, the enterprise server 20 may transmit the telephone porting information request message 132a to the telephone porting information server 200 and wait for a response. Upon receiving the telephone porting information response 142a, the enterprise server processor 22 determines that no tampering concern is raised by the response. The enterprise server may then transmit the call forwarding information request message 132b to the call forwarding information server 210 and wait for a response. Upon receiving the call forwarding information response 142b, the enterprise server processor 22 may determine that a tampering concern is raised by the response. At this point, the enterprise server 20 may decide not to transmit any further request messages and may move on to determining the trust level for the telephone number 34 based upon the determined tampering concern. Thus, in certain embodiments, the enterprise server 20 may minimize the number of request messages transmitted, reducing the processing power and bandwidth consumed by the system and possibly reducing the costs to the enterprise if costs are associated with the transmission of each request message 132a-132d.

Figure 4:
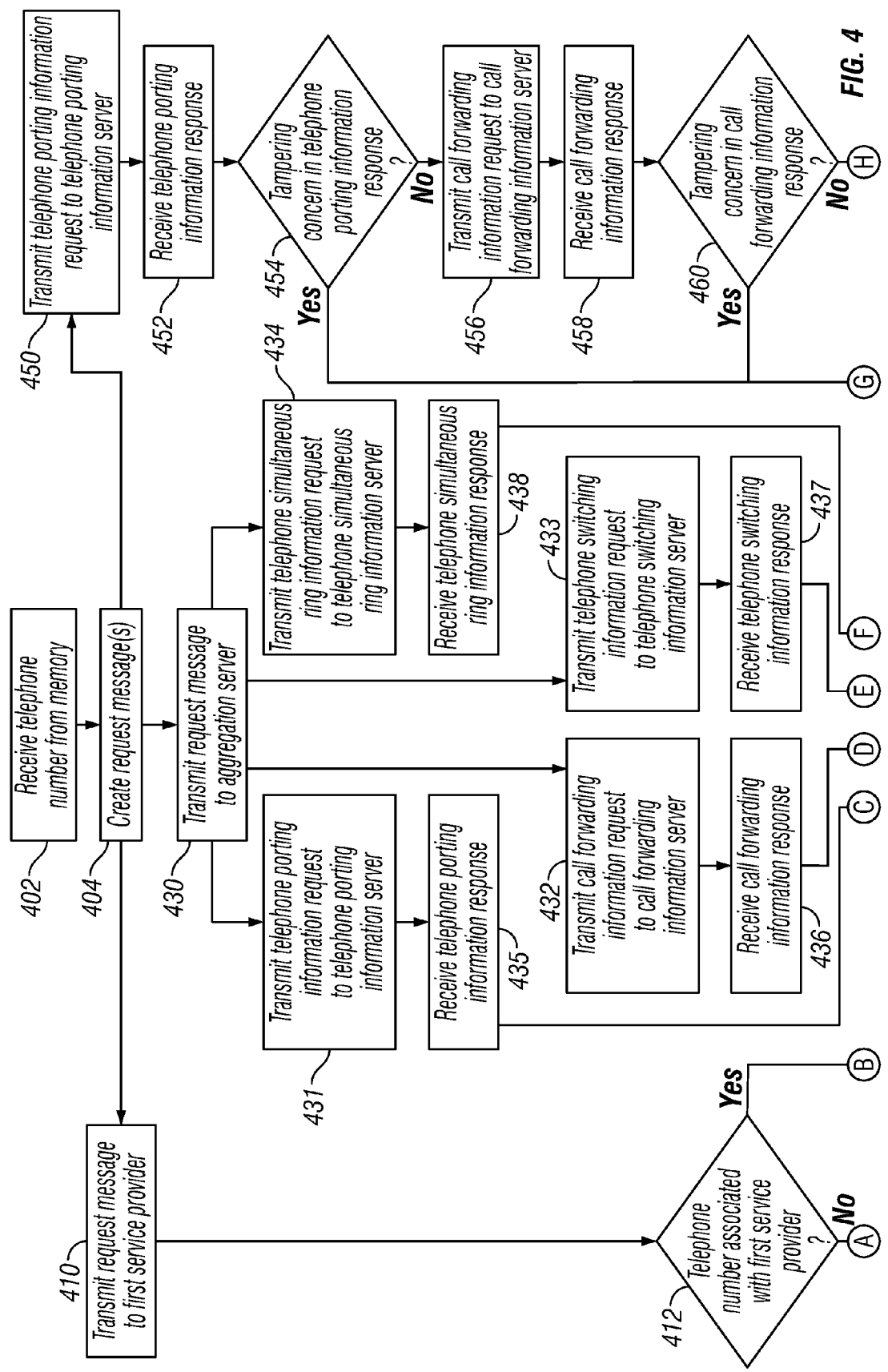
FIG. 4 is a flowchart illustrating a method for determining a trust level associated with a telephone number.
Figure 4:
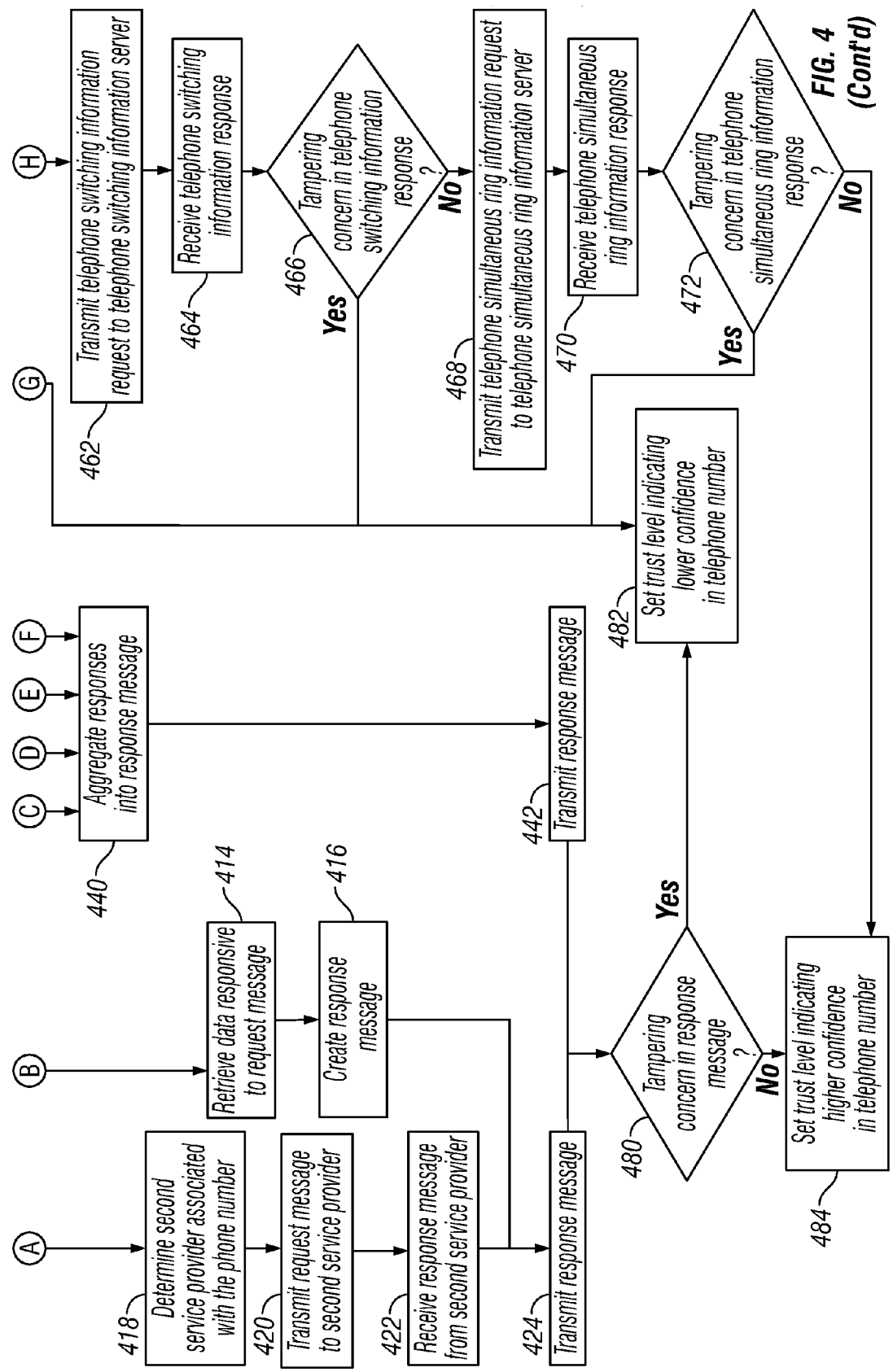

FIG. 4 illustrates an example method of determining a trust level associated with a telephone number 34. On the left side of FIG. 4, the steps associated with the embodiment illustrated in FIG. 1 are shown. In the middle of FIG. 4, the steps associated with the embodiment illustrated in FIG. 2 are shown. On the right side of FIG. 4, the steps associated with the embodiment illustrated in FIG. 3 are shown.

Starting at step 402, the enterprise server processor 22 receives the telephone number 34 upon which a trust level will be determined from the enterprise server memory 24. The enterprise server processor 22 then creates one or more request messages at step 404.

Moving to the left side of FIG. 4 first, at step 410, the enterprise server 20 transmits the request message 32 to the first service provider server 60. The first service provider server 60, at step 412, then determines whether the first service provider provides telephone services for the telephone number 34. If so, the process moves to step 414 where the first service provider server 60 retrieves the information requested by the request message 32 from the telephone information database 66. Then at step 416, first service provider server 60 creates a response message 112 using the information and transmits the response message 112 to the enterprise server 20 at step 424.

If, at step 412, the first service provider server 60 determines that it does not provide telephone services to the telephone number 34, then the process moves to step 418. There, the first service provider server determines which service provider provides telephone services for the telephone number 34. Using this information, the first service provider server 60 transmits a request message 72 to a second service provider server 80 at step 420. At step 422, the first service provider server 60 receives a response message 102 from the second service provider server 80. At step 424, the first service provider server 60 transmits a response message 112 to the enterprise server 20. This completes the process of gathering responses on the left side of FIG. 4.

Moving now to the center portion of FIG. 4 and describing the embodiment illustrated in FIG. 2, the enterprise server 20 transmits the request message to the aggregation server 120 at step 430. The aggregation server 120 then transmits the telephone porting information request message 132*a* to the telephone porting information server 200 at step 431, the call forwarding information request message 132*b* to the call forwarding information server 210 at step 432, the telephone switching information request message 132*c* to the telephone switching information server 220 at step 433, and the telephone simultaneous ring information request message 132*d* to the telephone simultaneous ring information server 230 at step 434.

The aggregation server then receives the responses to the requests—the telephone porting information response message 142*a* at step 435, the call forwarding information response message 142*b* at step 436, the telephone switching information response message 142*c* at step 437, and the telephone simultaneous ring information response message 142*d* at step 438. At step 440, the aggregation server 120 aggregates these response messages 142*a*-142*d* and creates a response message 112. The aggregation server transmits the response message 112 to the enterprise server at step 442. This completes the process of gathering responses in the center portion of FIG. 4.

Regarding the left side and center portion process steps illustrated in FIG. 4, after the response message 112 is transmitted to the enterprise server 20 at either step 424 or step 442, the enterprise server 20 then determines whether a tampering concern is raised by any of the responses in the response message 112 at step 480. The process of determining a tampering concern has been described in detail above.

If a tampering concern is raised, the process moves to step 482 where a trust level is determined that indicates a lower level of confidence that a call to the telephone number 34 would be received by the actual customer and not an imposter. If no tampering concerns are raised, the process moves to step 484 where a trust level is determined that indicates a higher level of confidence that a call to the telephone number 34 would be received by the actual customer and not an imposter.

Finally, moving to the right side of FIG. 4 and describing the embodiment illustrated in FIG. 3, the enterprise server 20 transmits the telephone porting information request message 132*a* to the telephone porting information server 200 at step 450 and receives the telephone porting information response message 142*a* at step 452. Then, in step 454, the enterprise server processor 22 determines whether a tampering concern is raised by the telephone porting information response 86 contained in the telephone porting information response message 142*a*. As described above, this process involves, in some embodiments, determining whether a specified event occurred and comparing the time of that event against a threshold in the enterprise server criteria 26. If a tampering concern is raised, the process moves to step 482 to determine a trust level. If no tampering concern is raised, the process moves to step 456.

There, the enterprise server 20 transmits the call forwarding information request message 132*b* to the call forwarding information server 210 at step 456 and receives the call forwarding information response message 142*b* at step 458. Then, in step 460, the enterprise server processor 22 determines whether a tampering concern is raised by the call forwarding information response 88 contained in the call forwarding information response message 142*b*. If a tampering concern is raised, the process moves to step 482 to determine a trust level. If no tampering concern is raised, the process moves to step 462.

There, the enterprise server 20 transmits the telephone switching information request message 132*c* to the telephone switching information server 220 at step 462 and receives the telephone switching information response message 142*c* at step 464. Then, in step 466, the enterprise server processor 22 determines whether a tampering concern is raised by the telephone switching information response 90 contained in the telephone switching information response message 142*c*. If a tampering concern is raised, the process moves to step 482 to determine a trust level. If no tampering concern is raised, the process moves to step 468.

There, the enterprise server 20 transmits the telephone simultaneous ring information request message 132*d* to the telephone simultaneous ring information server 230 at step 468 and receives the telephone simultaneous ring information response message 142*d* at step 470. Then, in step 472, the enterprise server processor 22 determines whether a tampering concern is raised by the telephone simultaneous ring information response 92 contained in the telephone simultaneous ring information response message 142*d*. If a tampering concern is raised, the process moves to step 482 to determine a trust level. If no tampering concern is raised, the process moves to step 484.

At step 482, a trust level is determined that indicates a lower level of confidence that a call to the telephone number 34 would be received by the actual customer and not an imposter. Alternatively at step 48, a trust level is determined that indicates a higher level of confidence that a call to the telephone number 34 would be received by the actual customer and not an imposter. This concludes the process of determining a trust level associated with a telephone number 34.

It should be noted that the process of sending request messages 132*a*-132*d* could be performed in any order and still fall within the teachings of this disclosure. For instance, the enterprise could determine that the telephone simultaneous ring information request message 132*d* should be sent first and that the call forwarding information request message 132*b* should be sent next. This could occur if the enterprise determines that it is receiving more tampering concerns from the telephone simultaneous ring response 92 than from other response. In this way, the number of transmissions of request messages may be minimized.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A system for making a trust determination of a telephone number, comprising:
   a memory operable to store a telephone number; and
   a processor communicatively coupled to the memory and operable to:
      transmit a request message to a service provider, the request message comprising the telephone number and at least two of the following:
         a telephone porting information request, requesting whether the telephone number has been ported from one service provider to another service provider;

a call forwarding information request, requesting whether calls to the telephone number are being forwarded to a different telephone number;

a telephone switching information request, requesting whether telephone hardware associated with the telephone number has been switched to different telephone hardware; and a telephone simultaneous ring information request, requesting whether calls to the telephone number will ring on another telephone number simultaneously;

receive a response message from the service provider, the response message comprising at least two of the following:

a telephone porting information response associated with the telephone number and responsive to the telephone porting information request;

a call forwarding information response associated with the telephone number and responsive to the call forwarding information request;

a telephone switching information response associated with the telephone number and responsive to the telephone switching information request; and a telephone simultaneous ring information response associated with the telephone number and responsive to the telephone simultaneous ring information request; and determine a tampering concern associated with at least one of the telephone porting information response, the call forwarding information response, the telephone switching information response, and the telephone simultaneous ring information response; and increase an inquiry level based at least upon the tampering concern.

2. The system of claim 1, wherein:
the telephone porting information request requests whether there is a telephone porting event associated with the telephone number and for a porting date and a porting time associated with the telephone porting event; and
the processor is further operable to compare the porting date and the porting time against a porting threshold.

3. The system of claim 1, wherein:
the call forwarding information request requests whether there is a call forwarding event associated with the telephone number and for a forwarding date and a forwarding time associated with the call forwarding event; and
the processor is further operable to compare the forwarding date and the forwarding time against a forwarding threshold.

4. The system of claim 1, wherein:
the telephone switching information request requests whether there is a telephone switching event associated with the telephone number and for a switching date and a switching time associated with the telephone switching event; and
the processor is further operable to compare the switching date and the switching time against a switching threshold.

5. The system of claim 1, wherein:
the telephone simultaneous ring information request requests whether there is a telephone simultaneous ring event associated with the telephone number and for a simultaneous ring date and a simultaneous ring time associated with the telephone simultaneous ring event; and the processor is further operable to compare the simultaneous ring date and the simultaneous ring time against a simultaneous ring threshold.

6. The system of claim 1, wherein the processor is further operable to determine a trust level associated with the telephone number based at least upon the tampering concern.

7. The system of claim 6, wherein the inquiry level is based at least upon the trust level and the tampering concern.

8. The system of claim 1, wherein an increase in the inquiry level prompts a human agent to contact a customer associated the telephone number.

9. A method for making a trust determination of a telephone number, comprising:

transmitting a request message to a service provider, the request message comprising the telephone number and at least two of the following:

a telephone porting information request, requesting whether the telephone number has been ported from one service provider to another service provider;

a call forwarding information request, requesting whether calls to the telephone number are being forwarded to a different telephone number;

a telephone switching information request, requesting whether telephone hardware associated with the telephone number has been switched to different telephone hardware; and a telephone simultaneous ring information request, requesting whether calls to the telephone number will ring on another telephone number simultaneously;

receiving a response message from the service provider, the response message comprising at least two of the following:

a telephone porting information response associated with the telephone number and responsive to the telephone porting information request;

a call forwarding information response associated with the telephone number and responsive to the call forwarding information request;

a telephone switching information response associated with the telephone number and responsive to the telephone switching information request; and a telephone simultaneous ring information response associated with the telephone number and responsive to the telephone simultaneous ring information request; and determining a trust level for the telephone number based at least upon the response message.

10. The method of claim 9, wherein:
the telephone porting information request requests whether there is a telephone porting event associated with the telephone number and for a porting date and a porting time associated with the telephone porting event; and the method further comprising:
comparing the porting date and the porting time against a porting threshold.

11. The method of claim 9, wherein:
the call forwarding information request requests whether there is a call forwarding event associated with the telephone number and for a forwarding date and a forwarding time associated with the call forwarding event; and the method further comprising
comparing the forwarding date and the forwarding time against a forwarding threshold.

12. The method of claim 9, wherein:
the telephone switching information request requests whether there is a telephone switching event associated with the telephone number and for a switching date and a switching time associated with the telephone switching event; and the method further comprising
comparing the switching date and the switching time against a switching threshold.

13. The method of claim 9, wherein:
the telephone simultaneous ring information request requests whether there is a telephone simultaneous ring event associated with the telephone number and for a simultaneous ring date and a simultaneous ring time associated with the telephone simultaneous ring event; and the method further comprising
comparing the simultaneous ring date and the simultaneous ring time against a simultaneous ring threshold.

14. The method of claim 9, further comprising:
determining a trust level associated with the telephone number based at least upon the tampering concern.

15. The method of claim 14, wherein the inquiry level is based at least upon the trust level and the tampering concern.

16. The system of claim 9, wherein an increase in the inquiry level prompts a human agent to contact a customer associated the telephone number.

17. A system for making a trust determination of a telephone number, comprising:
a memory operable to store a telephone information database; and
a processor operable to:
receive a request message from a user, the request message comprising a telephone number and at least two requests, wherein each of the at least two requests comprises at least one of:
a telephone porting information request, requesting whether the telephone number has been ported from one service provider to another service provider;
a call forwarding information request, requesting whether calls to the telephone number are being forwarded to a different telephone number;
a telephone switching information request, requesting whether telephone hardware associated with the telephone number has been switched to different telephone hardware; and
a telephone simultaneous ring information request, requesting whether calls to the telephone number will ring on another telephone number simultaneously;
receive from the telephone information database at least two responses, wherein each of the at least two responses comprises at least one of:
a telephone porting information response associated with the telephone number and responsive to the telephone porting information request;
a call forwarding information response associated with the telephone number and responsive to the call forwarding information request;
a telephone switching information response associated with the telephone number and responsive to the telephone switching information request; and
a telephone simultaneous ring information response associated with the telephone number and responsive to the telephone simultaneous ring information request
create a response message, the response message comprising the at least two responses; and
transmit the response message to the user.

18. The system of claim 17, wherein the processor is further operable to:
determine that the telephone information database does not comprise data responsive to at least one of the at least two requests;
transmit the request message to a service provider server;
receive a service provider server response message; and
append the service provider response message to the response message.

19. The system of claim 18, wherein the service provider server is associated with a service provider that provides telephone services to the telephone number.

20. The system of claim 17, wherein the telephone number may associated with a mobile telephone or a landline telephone.

* * * * *